United States Patent [19]

Valdez et al.

[11] 4,359,722

[45] Nov. 16, 1982

[54] EARTHQUAKE DETECTION SYSTEM WITH PENDULUM SWITCH

[76] Inventors: Alfredo A. Valdez, c/o George Spector, 3615 Woolworth Bldg., 233 Broadway; George Spector, 3615 Woolworth Bldg., 233 Broadway, both of New York, N.Y. 10007

[21] Appl. No.: 47,917

[22] Filed: Jun. 12, 1979

Related U.S. Application Data

[63] Continuation of Ser. No. 839,927, Oct. 6, 1977.

[51] Int. Cl.³ .............................................. G08B 21/00
[52] U.S. Cl. ..................................... 340/540; 307/117
[58] Field of Search .................... 340/540, 566, 690; 200/61.45 R, DIG. 9; 307/117

[56] References Cited

U.S. PATENT DOCUMENTS

| 893,997 | 7/1908 | Haas et al. | 340/566 |
| 2,448,597 | 9/1948 | Jolley et al. | 340/63 |
| 3,962,693 | 6/1976 | Schamblin | 340/565 |
| 4,214,238 | 7/1980 | Adams et al. | 340/540 |

Primary Examiner—Glen R. Swann, III

[57] ABSTRACT

An instrument for warning an unaware person at a start of an earthquake; the instrument including a suspended pendulum which at its lower end has an electric contact spaced from a stationary ring-shaped contact which surrounds the pendulum contact, so that during an earth tremor the stationary contact moves together with the earth, thus engaging the suspended contact and accordingly closing an electric circuit with an audible alarm.

2 Claims, 4 Drawing Figures

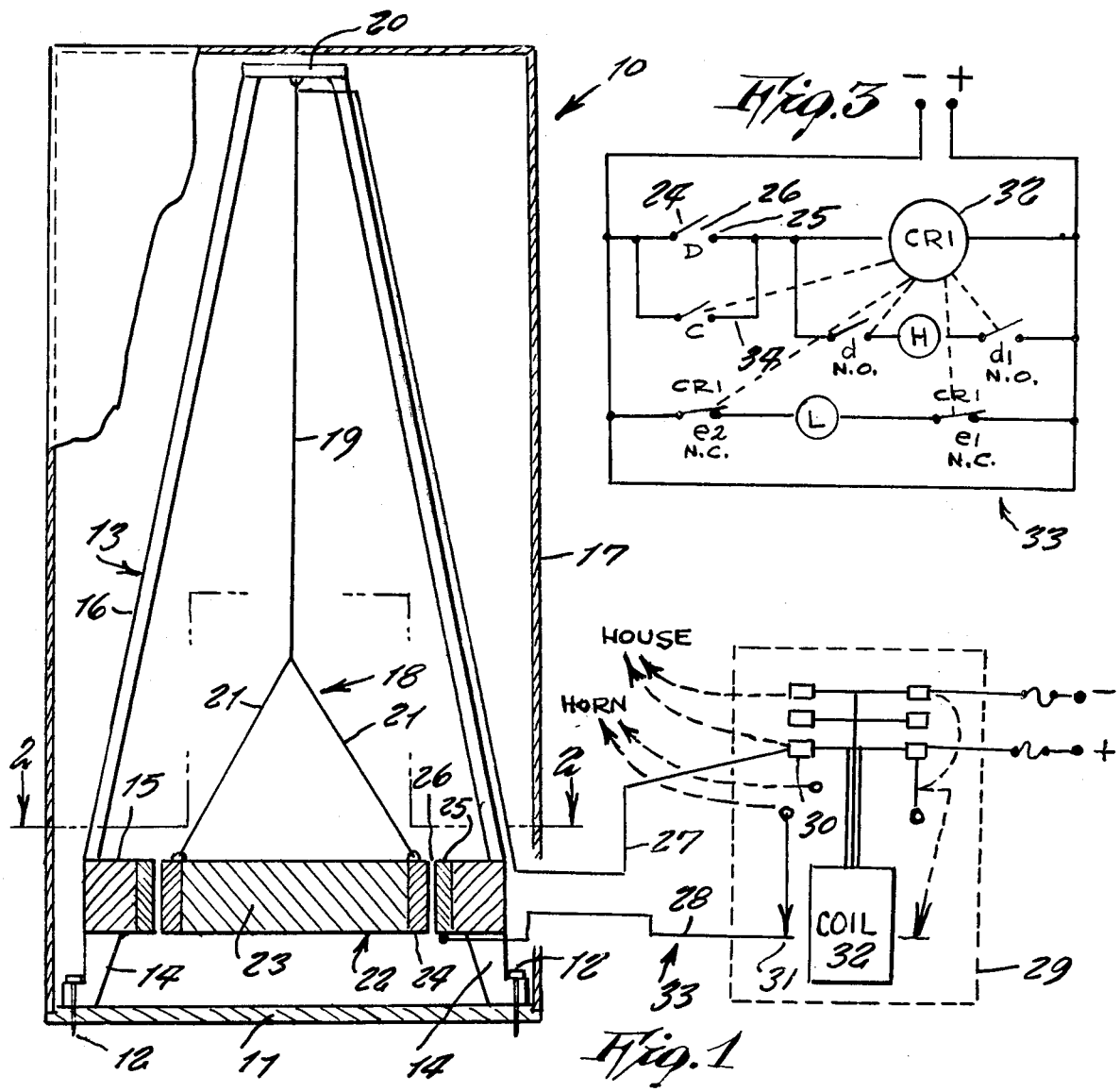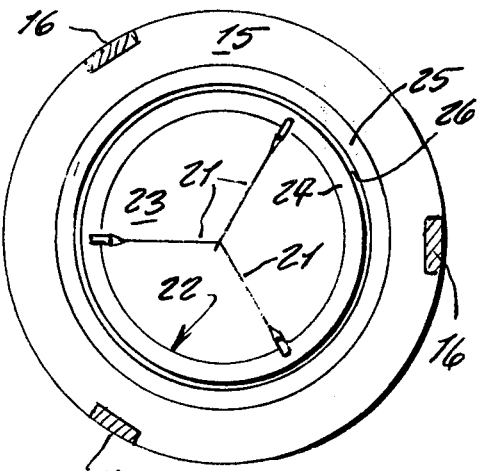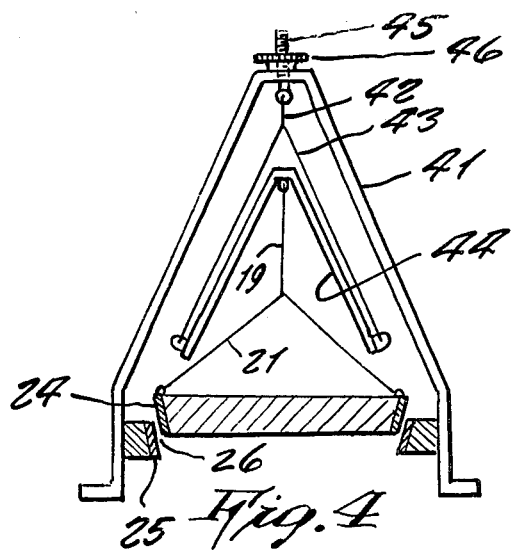

EARTHQUAKE DETECTION SYSTEM WITH PENDULUM SWITCH

This is a continuation of application Ser. No. 839,927, filed Oct. 6, 1977.

BACKGROUND OF INVENTION

This invention relates generally to automatic warning devices and more specifically to an earthquake warning device.

It is well known that an earthquake can be of magnitudes which can result in distructions of many lives due to being trapped under falling structures such as buildings.

SUMMARY OF INVENTION

Accordingly, it is a principal object of the present invention to provide an instrument that automatically warns persons at the instant of a first tremor of an impending earthquake so that refuge can be taken away from under falling structures.

Another object is to provide an automatic warning device which sounds an audible alarm in order to warn persons even when asleep.

Another object is to provide an automatic warning device which is small and compact so to take up a minimum space in a house.

Another object is to provide an earthquake warning instrument which can be hooked up to a house circuit breaker in order to immediately shut off electricity to the house at an instant of a first tremor so to prevent a short circuit in a distintegrating house and resultant fire that can endanger lives and further destroy property.

Other objects are to provide an earthquake awaken and fire prevent device which is simple in design, inexpensive to manufacture, rugged in construction, easy to use and efficient in operation.

These and other objects will be readily evident upon a study of the following specifications and the accompanying drawing wherein:

BRIEF DESCRIPTION OF THE DRAWINGS

FIG. 1 is a side cross sectional view of the senstive instrument electrical connected to a relay shown diagrammatically.

FIG. 2 is a view in direction 2—2 of FIG. 1, and showing the inner and outer rings.

FIG. 3 is an electric circuit of the invention.

FIG. 4 is a diagram of a modified design of the invention in which physical construction may be made smaller while retaining a full sensitivity of a larger instrument.

DETAILED DESCRIPTION

Refering now to the drawing in greater detail, and more particularly to FIGS. 1, 2 and 3 at this time, the reference numeral 10 represents an earthquake awakening and fire preventive instrument according to the present invention wherein there is a base 11 that can be stationarily and rigidly secured by means of bolts or nails 12 to any heavy object that can only be moved in case of an earthquake occurance. Such stable object may comprise a house or building structure itself or else a heavy furniture item. Upon the base there is rigidly affixed a frame 13 so as to be integral with the base; the frame including serval legs 14 integral with a horizontal ring 15 and a tripod 16 extending upwardly from the ring. This stationary construction is enclosed under a dome 17 mounted on the base so that nothing can accidently strike against a sensitive unit 18 which is supported from the tripod.

The sensitive unit comprises a pendulum that includes a long thin wire 19 suspended at its upper end from an apex 20 of the tripod, the lower end of the wire branching into three diverging wires 21 which are attached equidistant apart to a weight 22 that includes a heavy metal core 23 inside a circular ring 24 made of copper. The core is made heavy so that in case of an earthquake tremor it remains stationary due to its inertial property.

The inner side of the frame ring 15 is fitted with a circular copper ring 25 that is positioned spaced around the ring 24. The space 26 formed all around between the rings 24 and 25 is only 1/16th inch wide which is sufficient to keep an electrical charge from normally passing therebetween, but which is narrow enough so that in case the outer stationary ring is sidewardly shifted even a microscopic distance the gap of the space 26 is decreased at some point sufficiently enough so that an electrical charge can jump between the rings.

A wire conductor 27 connected at one end electrically to wire 19, and a wire conductor 28 connected at one end to the ring 25 extended at their opposite ends to a relay 29 where wire 27 is attached to a terminal 30 and the wire 28 is attached to a switch terminal 31.

The relay includes coil 32 which (as diagrammed in FIG. 3) is electrically activated by closing of a circuit 33 whereeever the stationary ring 25 is slightly moved such as by an earthquake tremor. Thus the rings 24 and 25 form a switch for the circuit.

When the circuit 33 is closed, the activated coil moves contacts d and d1 in order to cause a horn 37 to be sounded inside a house.

In FIG. 3, the electrical circuit 33 is seen to include a holding circuit 34 to prevent the relay going off after having gone momentarily on, thus maintaining the alarm to keep sounding. Contacts e and e1 open at the initial tremor so to disconnect electricity to the house or building and prevent possibility of a fire due to a short circuit resulting from a falling building.

In FIG. 4, a modified design of instrument 40 is a same as instrument 10 except that the instrument is made more compact and smaller in size having a relatively low tripod 41 from which a wire 42 and three wires 43 support a second tripod 44 by its lower end; the upper end of the second tripod supporting a shortened wire 19 and three wires 21 to the weight 22. Thus a same sensitively is maintained in a more compact instrument.

In this design the rings 24 and 25 are of frusto-conical shape, so that a fine adjustment of space 26 therebetween is possible by adjusting a vertically movable screw 45 threaded through a nut 46 resting freely upon the apex 46 of the tripod 41.

While various changes may be made in the detail construction, it is understood that such changes will be within the spirit and scope of the present invention as in defined by the appended claims.

What is claimed is:

1. An earthquake alert and fire prevention system comprising a pendulum-actuated switch in series with a relay controlling parallel circuits to an alarm and a house, said relay, in response to the closure of said pendulum switch, being movable from a first position wherein said alarm is inoperative and the house circuit is operative to a second position wherein the alarm circuit is operative and the house circuit inoperative, in further combination with holding circuit means in parallel with said pendulum-actuated switch wherein said switch comprises a base affixed to a rigid support having an enveloping hood, further including an electrically conducting ring electrically connected to said relay mounted on and electrically insulated from said base and further including a pendulum support affixed to said base and extending thereabove having a pendulum disc suspended by a wire conductor therefrom concentrically within said ring, said pendulum having an electrically conducting peripheral annulus electrically connected to said relay via said wire normally spaced from and disposed within said ring, including an additional mass suspended between said support and disc.

2. The combination of claim 1 wherein said additional mass comprises a member similar in shape to the said support and axially aligned with said support whereby the combined mass of the disc and said additional mass increase the pendular momentum.

* * * * *